United States Patent
Vinn et al.

(10) Patent No.: US 7,230,408 B1
(45) Date of Patent: Jun. 12, 2007

(54) PULSE FREQUENCY MODULATED VOLTAGE REGULATOR WITH LINEAR REGULATOR CONTROL

(75) Inventors: Charles L. Vinn, Milpitas, CA (US); Raymond D. Zinn, Atherton, CA (US)

(73) Assignee: Micrel, Incorporated, San Jose, CA (US)

( * ) Notice: Subject to any disclaimer, the term of this patent is extended or adjusted under 35 U.S.C. 154(b) by 0 days.

(21) Appl. No.: 11/316,470

(22) Filed: Dec. 21, 2005

(51) Int. Cl.
*G05F 1/40* (2006.01)

(52) U.S. Cl. .................... 323/273; 323/282

(58) Field of Classification Search .............. 323/268, 323/271, 282, 284, 285, 273
See application file for complete search history.

(56) References Cited

U.S. PATENT DOCUMENTS

| | | | | |
|---|---|---|---|---|
| 5,528,132 A * | 6/1996 | Doluca | ................. | 323/284 |
| 5,592,072 A * | 1/1997 | Brown | ................. | 323/268 |
| 6,239,509 B1 * | 5/2001 | Rader et al. | ................. | 307/11 |
| 6,972,548 B2 * | 12/2005 | Tzeng et al. | ................. | 323/282 |
| 7,071,665 B2 * | 7/2006 | Tzeng et al. | ................. | 323/282 |

* cited by examiner

Primary Examiner—Adolf Berhane
(74) Attorney, Agent, or Firm—Bever, Hoffman & Harms, LLP; Patrick T. Bever

(57) ABSTRACT

A PFM-type voltage regulator circuit converts an unregulated input voltage into a regulated output voltage using a first transistor controlled by a pulse control circuit and a second transistor controlled by a linear regulator circuit. The linear regulator circuit controls the second transistor when the regulated output voltage falls to a predetermined minimum target voltage level, thereby maintaining the regulated output voltage at the minimum target voltage level. The pulse control circuit detects the current passing through the second transistor, and in response generates a pulse signal having a predetermined duration that fully turns on the first transistor. The voltage through the first transistor is converted to an increasing inductor current that refreshes the regulated output voltage to a maximum target voltage level. When the pulse signal ends, the regulated output voltage again begins to fall toward the predetermined minimum target voltage level, and the cycle is repeated.

20 Claims, 4 Drawing Sheets

PULSE FREQUENCY MODULATED VOLTAGE REGULATOR WITH LINEAR REGULATOR CONTROL

FIELD OF THE INVENTION

This invention relates to voltage regulators and, in particular, to pulse-frequency-modulated (PFM) switching-type voltage regulators.

BACKGROUND OF THE INVENTION

Switching regulators and linear regulators are well known types of voltage regulators for converting an unregulated voltage, such as a battery voltage, to a regulated DC output voltage of a desired value.

Linear regulators, also referred to as low dropout (LDO) regulators, include a control circuit and a linear switch (transistor) that is connected between the unregulated power supply and an output terminal. The control circuit monitors the regulated DC output voltage at the output terminal by way of a feedback signal, and controls the gate voltage of the linear switch such that the switch's conductance is adjusted to produce the desired DC output voltage level.

Switching regulators include a switch (transistor) and an inductor connected in series between the unregulated voltage and the output terminal, a filter capacitor, and an oscillator-based control circuit. The oscillator-based control circuit provides a time-varying control signal to the gate terminal of the switch, whereby the switch is turned on to pass the unregulated voltage to the inductor in short pulses. These pulses cause the inductor to store energy in its magnetic field, which produces the regulated DC output voltage. The filter capacitor serves to smooth and maintain the regulated DC output voltage between pulses. The regulated DC output voltage is fed back to an oscillator-based control circuit, which compares the feedback voltage with a reference voltage, and controls the oscillator output such that the switch duty cycle produces the desired regulated DC output voltage.

Switching regulators can generally be classified by the type of oscillator control as either pulse-width-modulated (PWM) or pulse-frequency-modulated (PFM) regulators. PWM regulators include an oscillator control circuit that produces a pulse train having a fixed frequency and a variable pulse width. PFM regulators, on the other hand, use oscillator control circuits that produce a fixed pulse width and a variable pulse frequency. In either case, the duty cycle of the transistor is controlled by the feedback voltage such that the regulated output voltage maintains the desired voltage level. Switching regulators are also characterized by whether they convert the unregulated voltage upward (boost or step-up configuration), convert the unregulated voltage downward (buck or step-down configuration), or invert the unregulated voltage (buck-boost or inverting configuration).

Switching regulators are generally considered to be more efficient than linear regulators, but are generally much noisier during operation. A linear regulator provides a very smooth output voltage because the linear switch is always partially on (conducting), but wastes power due to the large voltage differential across the linear switch. In contrast, the switching regulator transistor is either fully on or fully off. When a switching regulator transistor is fully on, such as in saturation or near the edge of saturation, the transistor is a highly efficient switch, and there is a minimum of wasted power through the switch. However, when load conditions suddenly increase, unlike linear voltage regulators that instantaneously adjust to the increased current demand, switching-type regulators can experience delays because the current through the inductor cannot change instantaneously with time. In addition, the control system around the switching regulator requires a longer time than a linear system to adjust the duty cycle to current-load the inductor properly.

What is needed is a voltage regulator circuit that combines the smooth, quickly responding output voltage of a linear voltage regulator and the high efficiency of a switching-type voltage regulator.

SUMMARY OF THE INVENTION

The present invention is directed to a voltage regulator circuit that utilizes a linear regulator circuit that is activated only when the regulated output voltage falls to a predetermined minimum target voltage level, and a pulse control circuit that detects activation of the linear regulator circuit, and refreshes the regulated output voltage to a predetermined maximum target voltage level each time the regulated output voltage reaches the minimum target voltage. By allowing output current to flow in the linear regulator circuit only when the regulated output voltage reaches the minimum target voltage level, and by designing the linear regulator circuit to naturally eliminate its output current each time the regulated output voltage is boosted by the pulse control circuit, the voltage regulator circuit of the present invention successfully combines the fast transient characteristics of conventional linear regulators with the high efficiency characteristics of a switching-type voltage regulator.

In accordance with an embodiment of the present invention, the voltage regulator circuit includes a first transistor connected in series with an inductor between an unregulated input voltage and the regulated output voltage and is controlled by the pulse control circuit, and the linear regulator circuit including a second transistor that is connected in parallel with the first transistor and inductor. The linear regulator circuit also includes a linear control circuit that generates a linear control voltage, which is on continuously, but serves to regulate the output of the second transistor each time the regulated output voltage falls to the predetermined minimum target voltage. The linear control voltage controls the second transistor to provide sufficient current to maintain the regulated output voltage at the predetermined minimum target voltage until the pulse control circuit activates the first transistor. In addition, the pulse control circuit includes a sensor for detecting a current through the second transistor, and transmits a pulse signal to the first transistor in response to the detected current. The pulse signal fully turns on the first transistor for a predetermined duration (time period), thereby causing a ramp in inductor current that raises the regulated output voltage. The amount of voltage increase is proportional to a difference between the input and output voltages ($V_{IN}-V_{OUT}$), the inductance, the time the first switch is held on, and the amount of inductor current. At the end of the predetermined duration, the pulse signal is de-asserted, which turns off the first transistor. The output voltage, stored on a capacitor, thus begins to fall in response to the applied load. When the output voltage again falls to the predetermined minimum target voltage level, the cycle is repeated. In this way, the efficiency of the voltage regulator circuit is dramatically increased over conventional linear regulators due to the relatively short time load current is passed through the second transistor, thus avoiding the high losses associated with linear regulators, and even approaching efficiencies associated with "pure" switching voltage regulators. That is, the only time that the linear regulator circuit conducts load current through the first transistor is during the delay period between detection of current through the second transistor and assertion of the pulse signal and subsequent enabling of the first transistor, which makes up a relatively small amount of the operating time, particularly when the applied load draws a relatively small current. Further, the voltage regulator circuit avoids the noise problems associated with "pure" switching type voltage regulators because the linear voltage circuit provides the required load current during the delay period between detection of current through the second transistor and the assertion of the pulse signal and subsequent enabling of the first transistor.

BRIEF DESCRIPTION OF THE DRAWINGS

These and other features, aspects and advantages of the present invention will become better understood with regard to the following description, appended claims, and accompanying drawings, where:

DETAILED DESCRIPTION OF THE DRAWINGS

The terms "coupled", "connected", "switched", which are utilized herein, are defined as follows. The term "connected" is used to describe a direct connection between two circuit elements, for example, by way of a metal line formed in accordance with normal integrated circuit fabrication techniques. In contrast, the term "coupled" is used to describe either a direct connection or an indirect connection between two circuit elements. For example, two coupled elements may be directly connected by way of a metal line, or indirectly connected by way of an intervening circuit element (e.g., a capacitor, resistor, inductor, or transistor). The term "switched" is utilized to describe a transistor that has a large gate-to-source voltage ($V_{gs}$), and can be represented as a low value resistor.

Figure 1:
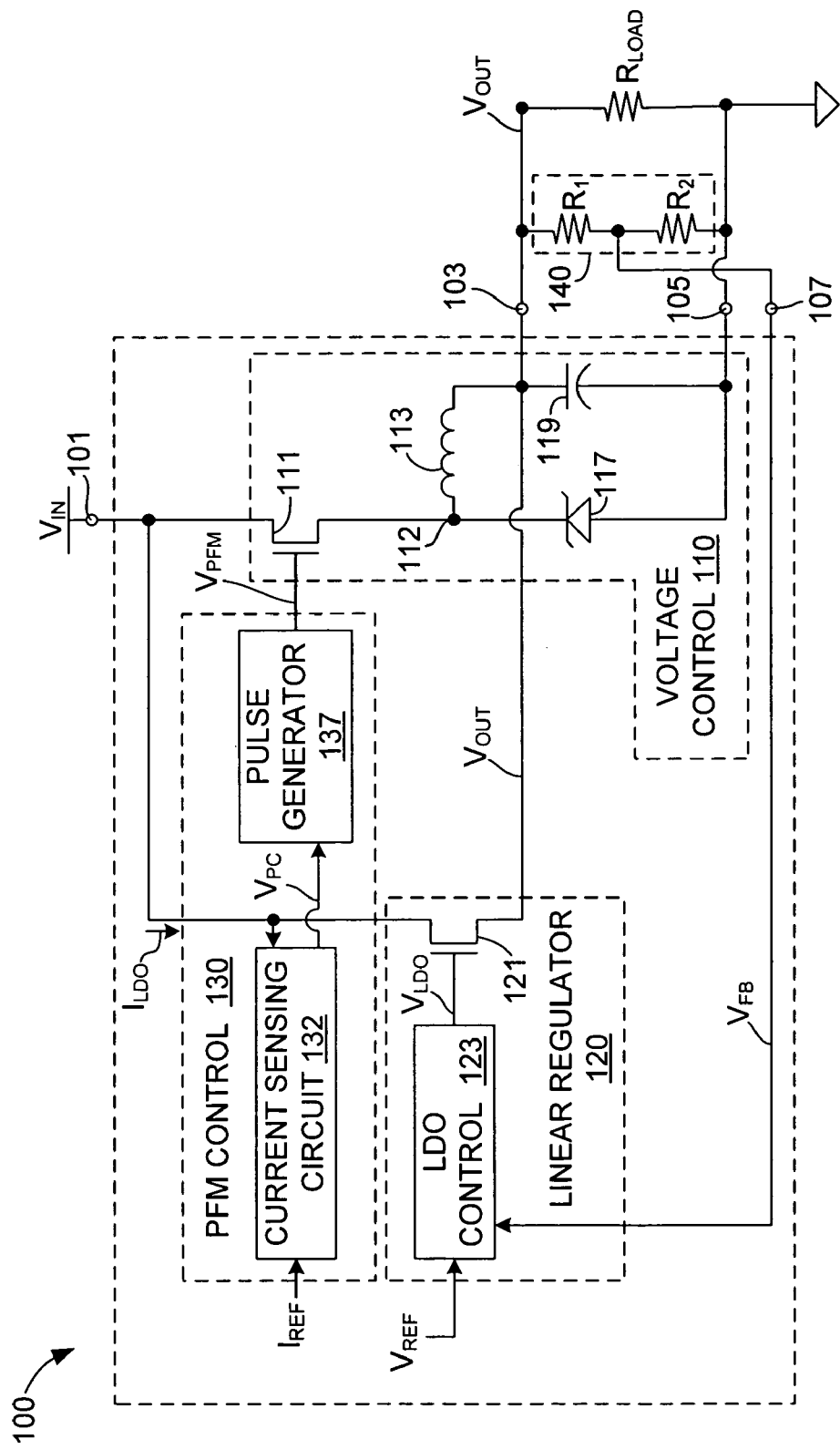
FIG. 1 is a simplified diagram showing a generalized voltage regulator circuit according to an embodiment of the present invention.

FIG. 1 is a simplified diagram depicting a voltage regulator circuit 100 for converting an unregulated input voltage $V_{IN}$ received at an input node 101 into a regulated output voltage $V_{OUT}$ provided at an output node 103. Voltage regulator circuit generally includes a voltage control circuit 110, a linear regulator circuit 120, and a pulse-frequency-modulation (PFM) control circuit 130 (also referred to as a pulse control circuit herein). In one embodiment, voltage regulator circuit 100 is a discrete component (i.e., formed on a semiconductor "chip") that is separate from an applied load (represented by resistor $R_{LOAD}$) and or a feedback circuit 140 (represented by feedback resistors $R_1$ and $R_2$). In this discrete embodiment input node 101 and output node 103, along with a ground node 105 and an optional feedback node 107, are connected to device pins or other terminal structures provided on a package structure housing the chip. In other embodiments, voltage regulator circuit 100 may be incorporated into a larger device (e.g., a microprocessor) that is fabricated on a single chip along with the load and feedback circuitry, in which case input node 101 and output node 103 may represent internal nodes of the larger circuit. The following description is intended to cover either of these broader classifications of integrated circuit devices.

Voltage control circuit 110 generally includes a (first) transistor (e.g., a field-effect transistor) 111, an inductor 113, a schottky diode 117 (or a switch) and a capacitor 119 that operate in conjunction with PFM control circuit 130 to function in a manner similar to a conventional PFM-type switching regulator (i.e., to generate periodic currents having a predetermined duration between input node 101 and inductor 113). Switch 111 and inductor 113 are connected in series by way of a node 112 between input node 101 and output node 103, with the gate terminal of transistor 111 being coupled to receive a pulse signal $V_{PFM}$ generated by PFM control circuit 130 in the manner described below. Switch 111 is sized and pulse signal $V_{PFM}$ is generated at a level such that transistor 111 is switched whenever pulse signal $V_{PFM}$ is applied to its gate (control) terminal, thereby causing transistor 111 to couple unregulated input voltage $V_{IN}$ to node 112 during the time (duration) that pulse signal $V_{PFM}$ is asserted. Therefore, the voltage difference $V_{IN}-V_{OUT}$ appears across inductor 113, causing a ramp increase in inductor current to generate an associated increase in voltage on output pin 103. Capacitor 119, which is connected between output node 103 and ground node 105, serves to store the charge provided by inductor 113 during assertions of pulse signal $V_{PFM}$.

Linear regulator circuit 120 functions in a manner similar to a conventional linear regulator to maintain output node 103 at a predetermined minimum target voltage level, but as is well known in linear systems, only conducts output current $I_{LDO}$ between input node 101 and the output node 103 when regulated output voltage $V_{OUT}$ is equal to or less than the predetermined minimum target voltage level. Linear regulator circuit 120 includes an output (second) transistor 121 that has first and second terminals respectively connected between input node 101 and output node 103 (i.e., in parallel with the current path formed by transistor 111 and inductor 113), and a linear (LDO) control circuit 123 that compares a linear reference voltage $V_{REF}$ with a feedback signal $V_{FB}$, and generates a linear control signal $V_{LDO}$ having a voltage level that is proportional to a difference between linear reference $V_{LDO}$ voltage and feedback signal $V_{FB}$. Linear reference voltage $V_{REF}$ and feedback signal $V_{FB}$ are generated substantially in accordance with conventional methods. However, in accordance with an aspect of the present invention, transistor 121 is fabricated and linear control signal $V_{LDO}$, linear reference voltage signal $V_{REF}$ and feedback signal $V_{FB}$ are generated such that transistor 121 conducts current $I_{LDO}$ only when regulated output voltage $V_{OUT}$ is equal to or less than the predetermined minimum target voltage level. That is, while output voltage $V_{OUT}$ is greater than the predetermined minimum target voltage level, linear regulator circuit 120 controls transistor 121 to a non-conductive state. Conversely, while output voltage $V_{OUT}$ is less than or equal to the predetermined minimum target voltage level, linear regulator circuit 120 controls (i.e., linear control signal $V_{LDO}$ is generated at a voltage level that turns on transistor 121 such that a current $I_{LDO}$ flows between input node 101 and output node 103 though transistor 121). The amount of current $I_{LDO}$ passed by transistor 121 to output node 103 when voltage regulator circuit 120 is activated (in control) is equal to the difference between the load current and the residual current in inductor 113.

In accordance with another aspect of the invention, PFM control circuit 130 functions to detect current conduction in linear regulator circuit 120 (i.e., when a non-zero current $I_{LDO}$ is passed through linear regulator circuit 130), and to generate pulse signal $V_{PFM}$ while linear regulator circuit 120 is active. In one embodiment, PFM control circuit 130 includes a current sensing circuit 132 that, in effect, senses current $I_{LDO}$ (i.e., the current through transistor 121), compares current $I_{LDO}$ with a predetermined minimum reference current $I_{REF}$, and generates pulse control signal $V_{PC}$ when the current $I_{LDO}$ exceeds a predetermined minimum current $I_{REF}$. Note that in one embodiment, minimum reference current $I_{REF}$ may be substantially zero Amps (i.e., any detected current triggers generation of pulse control signal $V_{PC}$). Pulse control signal $V_{PC}$ is supplied to a pulse generator 137 (e.g., a one-shot circuit) that asserts pulse signal $V_{PFM}$ for a predetermined duration in response to pulse control signal $V_{PC}$. As mentioned above, pulse signal $V_{PFM}$ is applied to the gate terminal of transistor 111, and has a predetermined fixed duration that fully turns on transistor 111 to increase the voltage at internal node 112 to essentially unregulated input voltage $V_{IN}$.

Figure 2A:
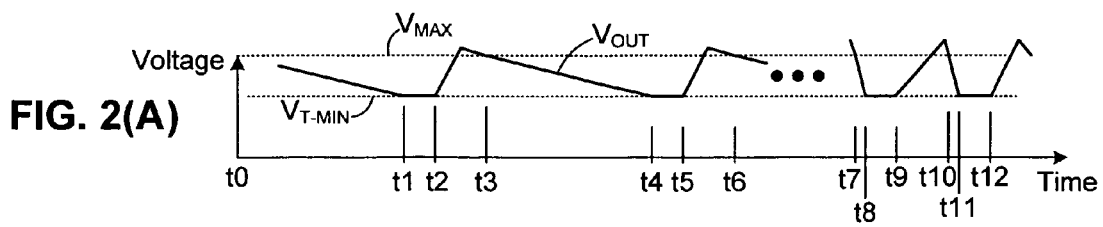
FIGS. 2(A), 2(B), 2(C) and 2(D) are timing diagrams showing signals generated during operation of the voltage regulator circuit of FIG. 1.
Figure 2B:
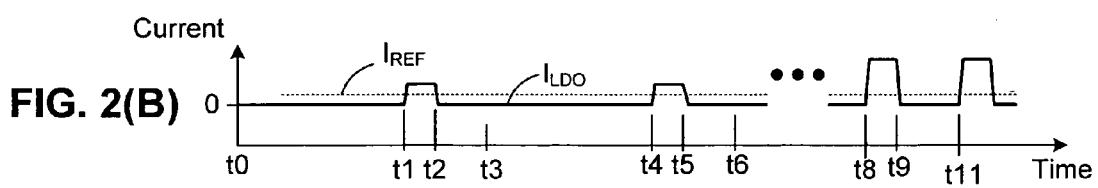
Figure 2C:
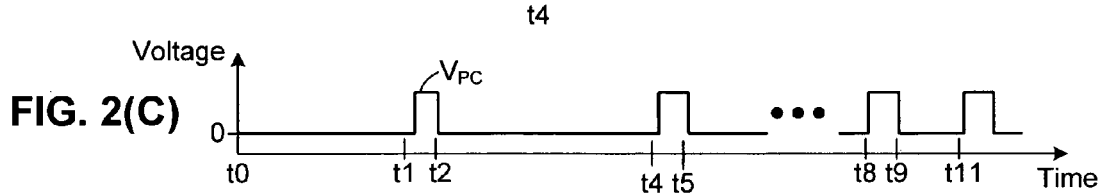
Figure 2D:
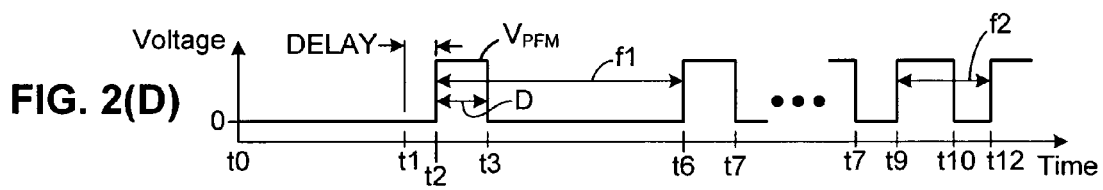

FIGS. 2(A) to 2(D) are timing diagrams depicting exemplary signals generated during operation of voltage regulator 100. FIG. 2(A) shows an exemplary regulated output voltage $V_{OUT}$ that is generated at output node 103 in response to hypothetical applied loads. FIGS. 2(B), 2(C) and 2(D) show current $I_{LDO}$ through transistor 121, pulse control signal $V_{PC}$, and pulse signal $V_{PFM}$, respectively, that are generated in conjunction with the exemplary regulated output voltage of FIG. 2(A). In these figures, the time period between time t0 and time t6 depicts operation of voltage regulator 100 in response to a relatively light applied load, and the time period between time t7 and time t12 depicts operation of voltage regulator 100 in response to a relatively heavy applied load.

Referring to the left side of FIG. 2(A), a charge generated at output node 103 and stored by capacitor 119 (FIG. 1) and is gradually depleted between time t0 and t1 by the relatively light applied load, thus causing regulated output voltage $V_{OUT}$ to gradually decrease toward a predetermined minimum target voltage $V_{T-MIN}$. As mentioned above, when regulated output voltage $V_{OUT}$ reaches predetermined minimum target voltage $V_{T-MIN}$ (e.g., at time t1; FIG. 2(A)), feedback signal $V_{FB}$ drops below linear reference voltage signal $V_{REF}$, causing LDO control circuit 123 to conduct current $I_{LDO}$ through transistor 121 (which is depicted in FIG. 2(B)). This interrupts the fall of regulated output voltage $V_{OUT}$ at minimum target voltage $V_{T-MIN}$ with minimal noise generation. Using known techniques utilized in conventional linear regulators, linear control signal $V_{LDO}$ is generated at a voltage level such that current $I_{LDO}$ through transistor 121 is equal to the current drawn by the applied load, thereby preventing output node 103 from falling below minimum target voltage $V_{T-MIN}$. Because current $I_{LDO}$ increases above the predetermined minimum current $I_{REF}$ (FIG. 2(B); shortly after time t1), current sensing circuit 132 asserts pulse control signal $V_{PC}$ (just after time t1; FIG. 2(C)). After a brief switching delay (DELAY; FIG. 2(D)), in response to the assertion of pulse control signal $V_{PC}$, pulse generator 137 asserts pulse signal $V_{PFM}$ (time t2; FIG. 2(D)), which turns on transistor 111. Note that the length of the delay period in FIG. 2(D) is arbitrarily selected for illustrative purposes. As described above, the resulting movement of transistor 111 to input voltage $V_{IN}$ is converted to an increasing inductor current by inductor 113 and pulls up output node 103, causing regulated output voltage $V_{OUT}$ to increase above minimum target voltage $V_{T-MIN}$ (time t2; FIG. 2(A)). The increase of output voltage $V_{OUT}$ above minimum target voltage $V_{T-MIN}$ is detected by LDO control circuit 123, which under linear control causes current $I_{LDO}$ to drop below predetermined minimum current $I_{REF}$ (shortly after time t2; FIG. 2(B)). The assertion of pulse control signal $V_{PC}$ is edge-triggered at the moment the comparator exceeds the minimum threshold (shortly after time t2; FIG. 2(C)). Referring again to FIG. 2(D), pulse signal $V_{PFM}$ remains asserted for predetermined duration D, which in the present example maintains regulated output voltage $V_{OUT}$ at the maximum target voltage level $V_{T-MAX}$. At time t3, pulse signal $V_{PFM}$ is de-asserted, and regulated output voltage $V_{OUT}$ again begins to decline from its maximum level.

Similar to conventional PFM-type switching regulators, the frequency at which fixed-duration pulse signal $V_{PFM}$ is generated is determined by the applied load. In the disclosed example, the relatively light applied load causes regulated output voltage $V_{OUT}$ to drop to minimum target voltage $V_{T-MIN}$ at time t4 (FIG. 2(A)), causing current $I_{LDO}$ to again flow through transistor 121 (time t4; FIG. 2(B)), which re-asserts pulse control signal $V_{PC}$ (shortly after time t4; FIG. 2(C)), which in turn re-asserts pulse control signal $V_{PC}$ (time t5; FIG. 2(D)). Thus, in response to the relatively light load, pulse signal $V_{PFM}$ is asserted at a relatively low frequency f1 (shown in FIG. 2(D)). In contrast, as indicated at the right side of FIGS. 2(A) to 2(D), a relatively heavy load causes regulated output voltage $V_{OUT}$ to drop to minimum target voltage $V_{T-MIN}$ at a relatively fast rate (e.g., between time t7 and t8 and between time t10 and t11 in FIG. 2(A)), which produces current $I_{LDO}$ through transistor 121 (FIG. 2(B)) and pulse control signal $V_{PC}$ (FIG. 2(C)) in the manner described above, thereby causing assertion of pulse signal $V_{PFM}$ at a relatively high frequency f2 (measured between assertion times t9 and t12, as shown in FIG. 2(D)). Note also that, in addition to drawing down regulated output voltage $V_{OUT}$ at a faster rate, the heavy applied load draws a relatively high current $I_{LDO}$ through transistor 121 (FIG. 2(B)). Linear regulator circuit 120 adjusts current $I_{LDO}$ to meet the load demand utilizing conventional linear voltage regulator methods.

As illustrated in the above example, the efficiency of voltage regulator circuit 100 is dramatically increased over linear regulators due to the relatively short amount time load current is passed through linear regulator 120, thus minimizing the high losses associated with linear regulators, and even approaching efficiencies associated with "pure" switching voltage regulators. That is, the only time that linear regulator circuit 120 conducts load current through transistor 121 is during the delay period between detection of current $I_{LDO}$ and assertion of pulse signal $V_{PFM}$ and subsequent enabling of the transistor 111, which as indicated in FIG. 2(A) makes up a relatively small amount of the operating time, particularly when the loads are light.

In addition, as illustrated in the above example, the voltage regulator circuit 100 avoids the low voltage noise problems associated with "pure" switching type voltage regulators in that linear voltage circuit 120 provides the required load current during the delay period between detection of current $I_{LDO}$ and assertion of pulse signal $V_{PFM}$ and subsequent enabling of the transistor 111.

Figure 3:
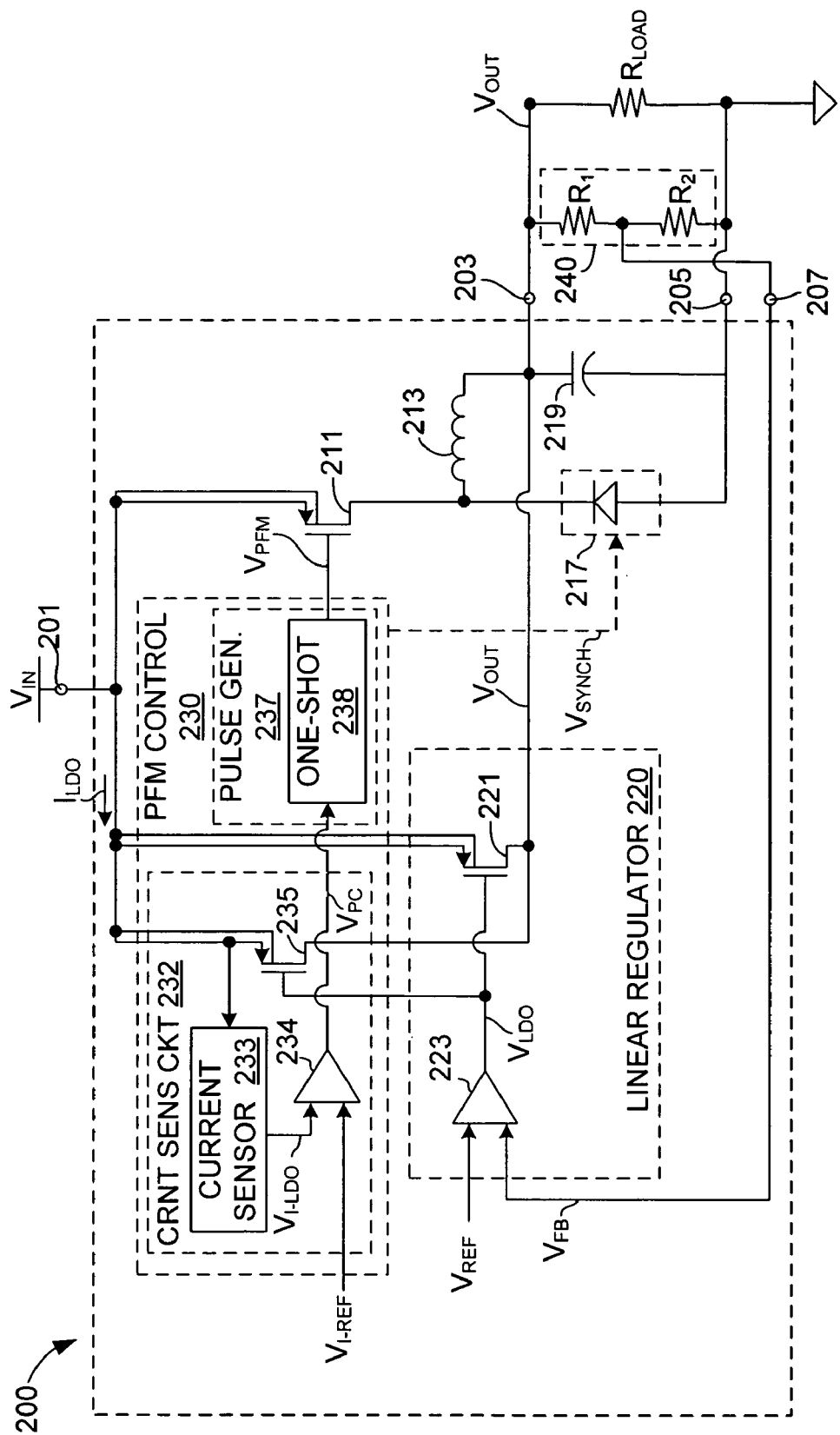
FIG. 3 is a simplified diagram showing a voltage regulator circuit according to a specific embodiment of the present invention.

FIG. 3 is a simplified diagram depicting a voltage regulator circuit 200 according to a specific embodiment of the present invention. Portions of voltage regulator circuit 200 that are similar to those of voltage regulator circuit 100 are identified with the similar reference numbers (e.g., transistor 121 of voltage regulator circuit 100 is represented by PMOS transistor 221 in voltage regulator circuit 200).

The voltage control portion of voltage regulator circuit 200 is characterized by the use of a PMOS transistors 211 and a rectifier circuit 217 in place of schottky diode 117. PMOS transistor 211 is the preferred transistor due to its low on-resistance. Rectifier circuit 217 is provided to enable synchronous operation. That is, voltage regulator 100 is depicted a non-synchronous configuration. Synchronous configuration is implemented according to known techniques by providing an NMOS transistor (not shown) in rectifier circuit 217 that is controlled using an optional synchronous operation control signal $V_{SYNCH}$ generated by PFM control circuit 230. During operation, after the time-out period of the one-shot circuit and PFM control circuit 230 shuts off PMOS transistor 211, instead of the resulting current circulating through schottky diode 117, the current is circulated through the NMOS transistor, which is activated by PFM control circuit 230 according to known techniques.

Linear regulator circuit 220 is also characterized by the use of a PMOS transistor 221, and a comparator 223 is utilized to generate linear control signal $V_{LDO}$ according to the methods described above.

PFM control circuit 230 includes a current sensing circuit 232 and a pulse generator 237 that operate substantially as described above. Current sensing circuit 232 includes a resistive sensor 233, a current comparator 234, and a (third) PMOS transistor 235. PMOS transistor 235 is connected in parallel with PMOS transistor 221 between input node 201 and output node 203, and is controlled by linear control signal $V_{LDO}$. Resistive sensor 233 generates a current detection signal $V_{I-LDO}$ when linear control signal $V_{LDO}$ is generated to produce current $I_{LDO}$ through PMOS transistors 221 and 235. Comparator 234 compares current detection signal $V_{I-LDO}$ with a predetermined reference signal $V_{I-REF}$, and generates pulse control signal $V_{PC}$ when current detection signal $V_{I-LDO}$ is greater than predetermined reference signal $V_{I-REF}$. Pulse control signal $V_{PC}$ is applied to a one-shot circuit 238 provided in pulse generator 237, which generates pulse signal $V_{PFM}$ for a preset time period (the predetermined duration) in response to pulse control signal $V_{PC}$.

The above embodiments depicted a non-synchronous configuration. In another embodiment a synchronous configuration is implemented according to known techniques in which diode circuit 217 includes an NMOS transistor (not shown) that is controlled by PFM control circuit 230. After the time-out period of the one-shot circuit and PFM control circuit 230 shuts off PMOS transistor 211, instead of the resulting current circulating through schottky diode 117, the current is circulated through the NMOS transistor, which is activated by PFM control circuit 230 according to known techniques.

Figure 4:
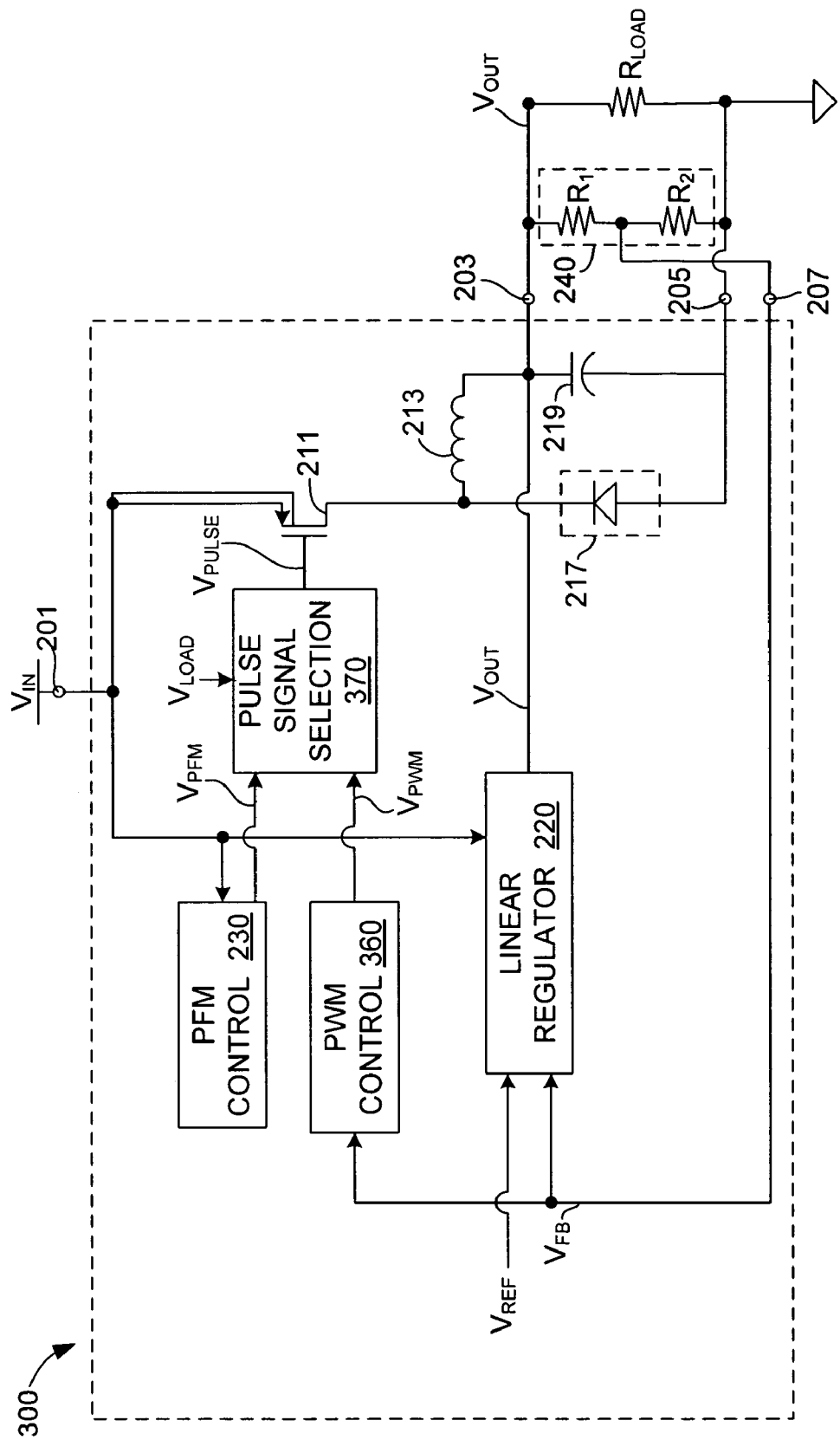
FIG. 4 is a simplified diagram showing a voltage regulator circuit according to another specific embodiment of the present invention.

FIG. 4 is a simplified diagram depicting a voltage regulator circuit 300 according to another embodiment of the present invention. Portions of voltage regulator circuit 300 that are identical to voltage regulator circuit 200 are identified with the same reference numbers. Voltage regulator circuit 300 differs from voltage regulator circuit 200 in that it includes a pulse-width-modulating (PWM) control circuit 360 and a pulse signal selection circuit 370. PWM control circuit 360 generates a pulse-width modulated control signal $V_{PWM}$ according to known techniques, and pulse signal selection circuit 370 determines the current demands of the applied load (the "applied load condition"), and selectively passes one of the PWM control signal $V_{PWM}$ and the pulse signal $V_{PFM}$ to the gate terminal of transistor 211 in response to the applied load condition. In one embodiment, the pulse signal $V_{PFM}$ is transmitted by pulse signal selection circuit 370 to transistor 211 when current loads are below 100 mA, and PWM control signal $V_{PWM}$ is transmitted by pulse signal selection circuit 370 to transistor 211 when current loads are greater than 100 mA.

Although the present invention has been described with respect to certain specific embodiments, it will be clear to those skilled in the art that the inventive features of the present invention are applicable to other embodiments as well, all of which are intended to fall within the scope of the present invention.

The invention claimed is:

1. A voltage regulator circuit for converting an unregulated input voltage received at an input node into a regulated output voltage provided at an output node, the voltage regulator comprising:
a first transistor having a first terminal coupled to the input node;
an inductor coupled between a second terminal of the first transistor and the output node;
a linear regulator circuit coupled in parallel with the first transistor and the inductor between the input node and the output node, wherein the linear regulator circuit includes means for passing a first current from the input node to the output node when the regulated output voltage provided at the output node drops below a predetermined minimum target voltage level such that the first current maintains the output node at the minimum target voltage level; and
a pulse control circuit including means for detecting the first current through the linear regulator circuit, and means for transmitting a pulse signal having a predetermined duration to a gate terminal of the first transistor in response to said detected first current.

2. The voltage regulator circuit of claim 1, wherein the linear regulator comprises:
a second transistor having a first terminal connected to the input node, a second terminal connected to the output node, and a gate terminal; and
a linear control circuit including means for comparing a linear reference voltage and a feedback signal, and for generating a linear control signal having a voltage level that is proportional to a difference between the linear reference voltage and the feedback signal,
wherein the linear control signal is applied to the gate terminal of the second transistor, whereby a conductance of the second transistor is controlled in response to the linear signal such that said first current passed by the second transistor is proportional to the linear control signal.

3. The voltage regulator circuit of claim 2, wherein the second transistor comprises a PMOS transistor sized such that the second transistor operates in a saturated operating state in response to the linear signal.

4. The voltage regulator circuit of claim 1, wherein the pulse control circuit comprises:
a current sensing circuit for asserting a pulse control signal when the first current passing through the linear regulator exceeds a predetermined minimum current; and
a pulse generating circuit for generating the pulse signal in response to the pulse control signal.

5. The voltage regulator circuit of claim 4, wherein the current sensing circuit comprises:

a sensor for generating a current detection signal in response to the first current passing through the linear regulator; and a comparator for comparing the current detection signal with a predetermined reference signal, and for generating the pulse control signal when the current detection signal is greater than the predetermined reference signal.

6. The voltage regulator circuit of claim 5, wherein the current sensing circuit further comprises a third transistor having a first terminal connected to the input node, a second terminal connected to the output node, and a gate terminal connected to the linear regulator circuit, wherein the sensor is coupled to the first terminal of the third transistor.

7. The voltage regulator circuit of claim 5, wherein the pulse generating circuit comprises a one-shot circuit.

8. The voltage regulator circuit of claim 1, wherein the first transistor comprises a field-effect transistor and the pulse control circuit comprises means for generating the pulse signal at a sufficient level such that the first transistor is switched in response to the pulse signal during the predetermined duration.

9. The voltage regulator circuit of claim 8, wherein the field-effect transistor comprises a PMOS transistor.

10. The voltage regulator circuit of claim 1, further comprising a diode connected between the output node and a ground terminal.

11. The voltage regulator circuit of claim 1, further comprising a capacitor connected between the output node and a ground terminal.

12. The voltage regulator circuit of claim 1, further comprising means for generating a pulse-width modulated control signal, and means for selectively applying one of the PWM control signal and the pulse signal to the gate terminal of the first transistor in response to an applied load condition.

13. A voltage regulator circuit for converting an unregulated input voltage received at an input node into a regulated output voltage provided at an output node such that the regulated output voltage is maintained at a predetermined minimum target voltage level, the voltage regulator comprising:

a first transistor having a first terminal coupled to the input node;

an inductor connected between a second terminal of the first transistor and the output node;

a second transistor having a first terminal coupled to the input node, and a second terminal connected to the output node;

linear control means for controlling the second transistor such that the second transistor conducts a first current between the input and output nodes when the regulated output voltage is equal to or less than the predetermined minimum target voltage level such that the first current maintains the output node at the minimum target voltage level; and pulse control means for controlling the first transistor to conduct a second current between the input node and the inductor when the linear control means causes the second transistor to conduct said first current such that the regulated output voltage provided at the output node is raised above the minimum target voltage level by the second current.

14. The voltage regulator circuit of claim 13, wherein the pulse control means comprises:

current sensing means for asserting a pulse control signal when the first current through the second transistor exceeds a predetermined minimum current; and pulse generating means for generating a pulse signal in response to the pulse control signal, wherein the pulse generating means is coupled to the gate terminal of the first transistor.

15. The voltage regulator circuit of claim 14, wherein the current sensing means comprises:

a sensor for generating a current detection signal in response to the first current through the second transistor; and means generating the pulse control signal when the current detection signal is greater than a predetermined reference signal.

16. The voltage regulator circuit of claim 15, wherein the current sensing means further comprises a third transistor having a first terminal connected to the input node, a second terminal connected to the output node, and a gate terminal connected to the gate terminal of the second transistor, wherein the sensor is coupled to the first terminal of the third transistor.

17. The voltage regulator circuit of claim 16, wherein the first, second and third transistors comprise PMOS transistors.

18. The voltage regulator circuit of claim 14, further comprising means for generating a pulse-width modulated control signal, and means for selectively applying one of the PWM control signal and the pulse signal to the gate terminal of the first transistor in response to an applied load condition.

19. The voltage regulator circuit of claim 13, further comprising a capacitor connected between the output node and a ground terminal.

20. A voltage regulator circuit for converting an unregulated input voltage received at an input node into a regulated output voltage provided at an output node such that the regulated output voltage is maintained at a predetermined minimum target voltage level, voltage regulator comprising:

an inductor coupled between the input node and the output node;

linear regulator means arranged in parallel with the inductor for selectively generating a first current between the input node and the output node only when the regulated output voltage is equal to or less than the predetermined minimum target voltage level such that the first current maintains the output node at the minimum target voltage level; and means for generating a second current between the input node and the inductor for a predetermined duration when the linear regulator means generates the first current such that the regulated output voltage provided at the output node is raised above the minimum target voltage level by the second current.

* * * * *